July 1, 1969
A. W. FRANCIS, JR., ET AL
3,453,205
METHOD AND MEANS FOR FIELD-PROCESSING CRUDE
PETROLEUM PRODUCTION
Filed March 8, 1967
Sheet 1 of 2
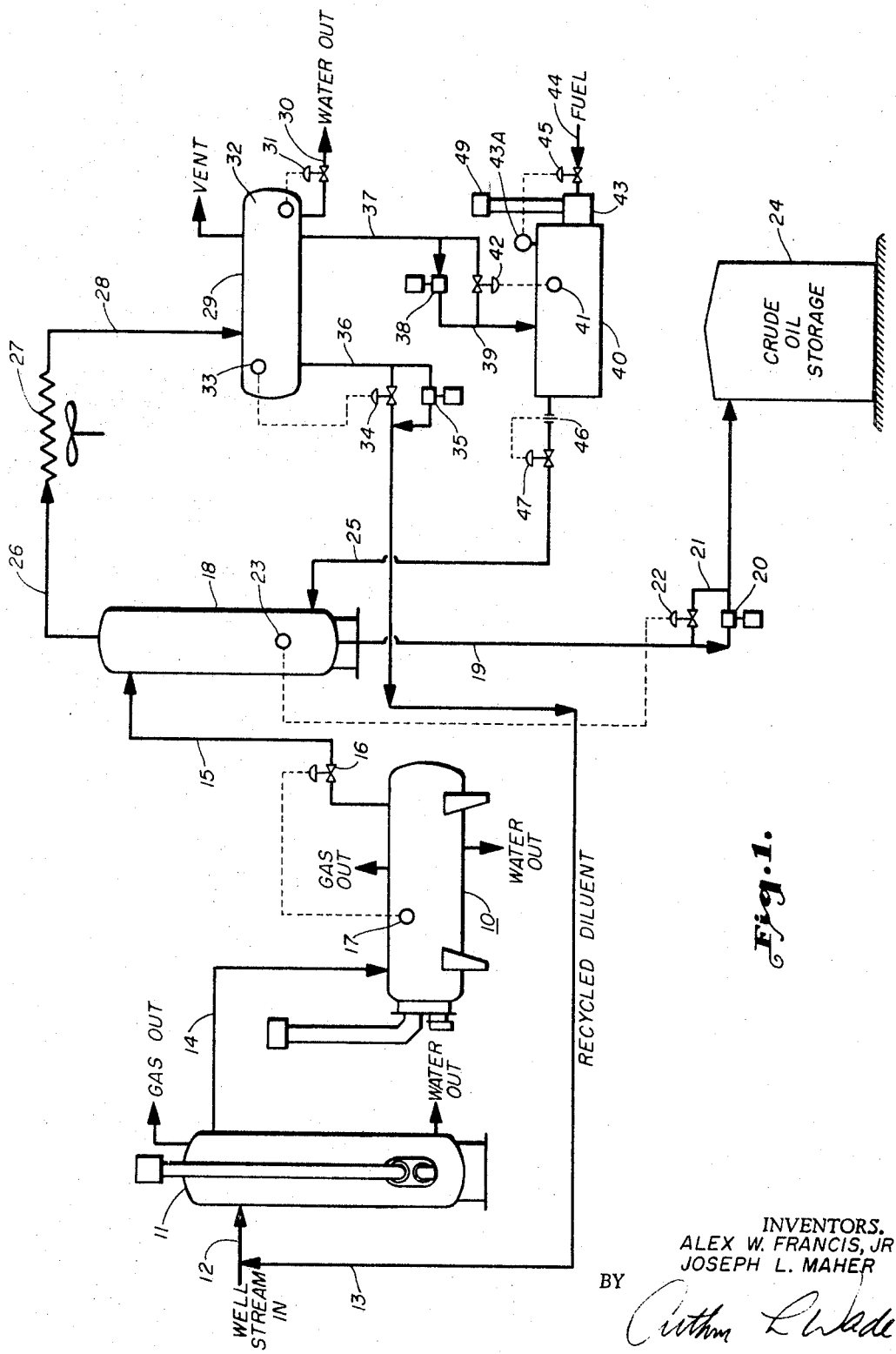
Fig. 1.
INVENTORS.
ALEX W. FRANCIS, JR.
JOSEPH L. MAHER
BY
ATTORNEY

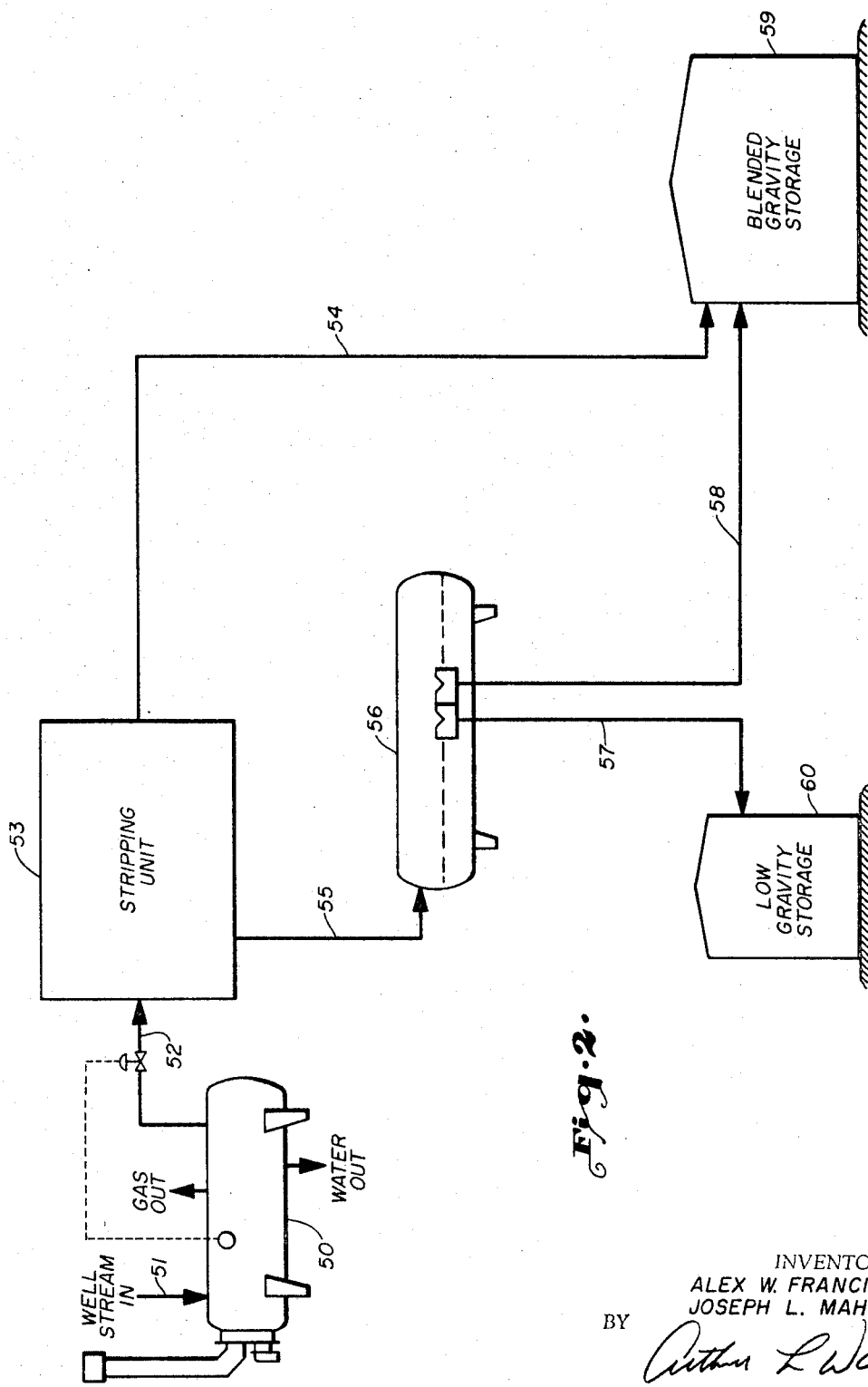

United States Patent Office 3,453,205
Patented July 1, 1969

3,453,205
METHOD AND MEANS FOR FIELD-PROCESSING CRUDE PETROLEUM PRODUCTION
Alex W. Francis, Jr., and Joseph L. Maher, Tulsa, Okla., assignors to Combustion Engineering, Inc., New York, N.Y., a corporation of Delaware
Filed Mar. 8, 1967, Ser. No. 621,674
Int. Cl. C10g 33/00, 31/14
U.S. Cl. 208—187    4 Claims

ABSTRACT OF THE DISCLOSURE

Produced oil is field processed at the wellhead followed by stripping off lighter hydrocarbons. The treated and stripped crude oil is divided into portions by a system of weirs and one portion mixed with the stripped off lighter hydrocarbons. The portions will then be of different gravities which can be sold for a total price higher than the unstripped, field-processed crude oil.

Background of the invention

*Field of the invention.*—The present invention relates to the control of the gravity of crude oil which is processed in the field and delivered to the first point of sale. More particularly, the invention relates to balancing the proportions of quantities into which a total stream of crude oil is divided to arrive at maximum economic gain for the producer.

*Description of the prior art.*—It is generally known that dilution of extremely viscous oil well production with a compatible material will greatly facilitate disengagement of water and other foreign material therefrom. Kerosene diesel mixture has been employed as a diluent. The concept has also been advanced of stripping lighter hydrocarbons from the crude oil out of the dehydration process and recycling this material back to the upstream side of the dehydration process as a diluent to facilitate the dehydration process.

The background of development of diluents, and their usage in processing, has made it apparent that gravity control the crude oil with diluents can raise the income of the producer. The problem is how to raise the gravity of a first portion of the crude oil processed until that portion can be sold at a price higher than the second portion. If gravity and quantity are balanced correctly, the total crude oil produced will sell for more than the total at one value of gravity.

A simple example will serve to illustrate the problem. If a particular crude oil produced has a gravity of 26.7° API, it could be that the price per barrel would be the same at 26° API. A higher price would be available at 27° API, but all of the available techniques of field-processing will not raise the gravity of the total higher than 26.7° API. How can the gravity of some portion of the crude be lowered to 26° API and the gravity of the remaining portion be raised to 27° API? Under present price structures, if 70% of a total 26.7° API gravity stream were raised to 27° API the total income would be increased 5.6 cents per barrel.

Summary of the invention

A principal object of the present invention is to divide a total stream of crude oil into portions and adjust the gravity of one portion in relation to the price structure for crude oil.

Another object is to strip lighter hydrocarbons from a total stream of crude oil to lower the gravity to a predetermined value, divide the stripped oil into portions and add the material stripped to one portion to raise the gravity a predetermined amount.

The present invention contemplates the process and structure with which a total stream of crude oil well production is processed in the field to reduce its water to a marketable percentage. The gravity of the marketable oil is then determined and a predtermined quantity of lighter hydrocarbons stripped from the total quantity of oil. The total quantity of oil is then divided into portions by weirs and the hydrocarbons stripped from the whole are blended with a divided portion to raise the gravity of the resulting mixture a predetermined amount.

Other objects, advantages and features of this invention will become more readily apparent to one skilled in the art upon consideration of the written specification, appended claims, and attached drawings.

Brief description of the drawings

FIG. 1 is a schematic flow diagram of a system in which diluent is used to assist in dehydrating crude oil, and FIG. 2 is a schematic flow diagram of a system in which the present invention is embodied, using diluent to control the gravity of crude oil.

Description of the preferred embodiment

*Field processing—treating (dehydration).*—Referring specifically to FIG. 1, there is disclosed a complete system for dehydrating the liquids of crude oil production. Basically, the production is received in a vessel 10 where heat may be applied to the production before water is coalesced and removed from the oil, leaving the oil dehydrated enough to be marketable at a refinery.

Before the production is passed through vessel 10, it may be preheated in a vessel 11. If used, this vessel is provided with a special construction which enables it to remove most of the sand entrained by the liquids flowing from the well. Further, a great deal of free water may be readily dropped from the liquids with this equipment. Vessel 11 represents one or more pieces of equipment which may be required to prepare the produced liquids for their final temperature level prior to coalescence in vessel 10.

Conduit 12 brings the complete stream of crude production to the system. This conduit is shown specifically introducing the stream into vessel 11, and a second conduit 13 is shown connected to conduit 12, representative of means with which to mix a diluent with the crude production upstream of the field processing equipment which vessels 10 and 11 represent.

It should be clearly understood that it is intended for the vessels 10 and 11, and their connections with the stream of crude production, to be but representative of many variations in equipment and hook-up for field-processing oil well production. For example, the diluent could be mixed with the production at a point further upstream than illustrated. There may be chemical injecting equipment, not shown, to reduce the surface tension between the oil and water of emulsion in the production. Gas may be removed at various locations; gas disengaged from the liquids in a more or less "free" state or gas evolved when the bubble point of the liquids is reached. Whatever the system of vessels and hook-up used, the present invention provides a diluent which facilitates the various steps of the field-processing of the crude production.

When their viscosity and density are lowered, the liquids will then more readily mix with chemicals. The free gas will more readily disengage from the liquids. The water will then more readily coalesce and then more readily fall and disengage from the lighter oil. These are some of the more obvious advantages gained from diluting the production with a liquid hydrocarbon consisting of lighter fractions. The diluent does not treat the production in any sense; it facilitates the treatment of the production by the conventional, well-known equipment and techniques that have been employed for many years.

The production from the preheater-desander 11 flows through conduit 14 and into treater 10. In vessel 11 the production is heated, gas is discharged, water is drawn off and the dehydrated oil is discharged through conduit 15. There are many control segments associated with the treating equipment. It would not add to an understanding of the present invention to dwell on these various control features and their relation to each other. Only the direct control exerted over the discharged oil is indicated.

The pressure carried on vessel 10 forces the oil through conduit 15. The rate of discharge is regulated by valve 16 which is placed in conduit 15. A level of the liquids in vessel 10 is sensed by a float 17 and the position of this float used to develop a control force to position valve 16. The liquids of conduit 15 are thus delivered to stripping tower 18 where a predetermined range of lighter hydrocarbons are removed from the liquids as the diluent.

*Stripping system in general.*—There are various fundamental techniques available for removing a selected range of hydrocarbons from the liquids of conduit 15. Steam stripping was selected for this embodiment of the invention. Superheated steam is passed in counter-current flow with the liquids in tower 18. A vapor mixture of steam and hydrocarbons is removed from the top of the tower while the stripped and dehydrated crude oil is removed from the bottom of the tower.

The crude oil is passed to storage and sale. The vapors are condensed into a mixture of water and the light hydrocarbons. The mixture is separated into its two components. The hydrocarbon liquid is cycled to conduit 12 as a diluent. The water is cycled to a steam generating system to form the superheated steam used as the stripping medium.

It is pointed out at this time that the liquids passed to tower 18 from conduit 15 contain a finite amount of water that the treating system could not remove. The percentage of the total volume of the liquids may be small, in the order of two percent or less, still there is an amount which will be vaporized in tower 18, along with a range of light hydrocarbons. This stripped water will be discussed further.

*Stripping tower 18.*—The construction and operation of tower 18 is basically simple. It is arranged and operated like any vapor-liquid contacting tower in which vapor equilibrium contact is brought about.

Trays are arranged in a stack. The liquid is introduced from conduit 15 onto the top tray and descends from tray to tray. The liquid reaching the bottom of the tower is removed through conduit 19 by pump 20. A by-pass conduit 21 around pump 20 is controlled by valve 22 which is positioned by float 23. The liquid is delivered by pump 20 to tank 24 for storage and eventual sale. Therefore, liquid is withdrawn from tower 18 so as to maintain a liquid level sensed by float 23.

The tower is supplied superheated steam at its bottom from conduit 25. This steam ascends the stack of trays within tower 18 and removes a predetermined range of light hydrocarbons from the crude oil descending within the tower. This mixture of vaporized hydrocarbons and steam is removed through conduit 26. The vaporized hydrocarbons and steam are then cooled to condense the hydrocarbons for use as the diluent.

It is desirable that as little heat as possible be used in tower 18. The cost of heating the oil being stripped mounts quickly if the heat requirement goes up. Therefore, the pressure of the tower should be at a minimum so the heat requirement will be as low as possible. Actually, it is expected that tower 18 will be kept at a pressure very close to atmospheric pressure. However, these values of pressure, temperature and flow should not be discussed so as to obscure the basic concept of the invention which obtains the new results desired.

The vapors from conduit 26 flow into a cooler 27 where their temperature is dropped until condensation takes place. An air cooler is depicted as representative of structure to carry out this temperature reduction. A fan is shown, passing air over heat-exchange coils in which the vapor from conduit 26 is passed. The vapors are not all condensed. The mixture of condensate and remaining vapors passes into conduit 28 for delivery to three-phase separator 29.

*Separator 29.*—As an individual unit, separator 29 is a conventional, well-known piece of apparatus. The stream from conduit 28 which is received into the vessel is a mixture of uncondensed vapor, water and the range of light hydrocarbons which was stripped from the crude oil in tower 18. Internal baffles of separator 29 are arranged to divide the water from the oil in separate compartments provided by the baffles.

The water is used to generate steam for use as the stripping medium in tower 18. Usually there will be more water collected in the separator 29 than stripping tower 18 requires. This is a result of the simple fact that the feed of liquids into tower 18 contains water that will be vaporized right along with the diluent hydrocarbons. Of course, this water will be condensed in cooler 27 and end up in separator 29. It is necessary to get rid of this excess water. Conduit 30 is connected to the water collected in separator 29. This conduit is then controlled by a valve 31 which is adjusted by float 32. Float 32 is responsive to the level of all water in separator 29, so if a predetermined level is maintained, excess water will be discharged through conduit 30.

Separation of the two liquid phases is carried out by allowing residence time for the liquids to separate and skimming the oil into a separate compartment. The oil level is sensed by float 33 which controls valve 34 in a by-pass conduit around pump 35. Pump 35 is connected to the oil in separator 29 by conduit 36. This pump system draws the oil, as the diluent, through conduit 36 and delivers it to conduit 13. The utilization of this diluent has already been disclosed. Thus, a complete, closed cycle is provided for the diluent which is built from a predetermined range of hydrocarbons from the crude production diluted.

*Steam generator 40.*—The water not in excess within separator 29 is withdrawn from separator 29 through conduit 37 for delivery to the steam generator. A pump 38 is connected to conduit 37 and withdraws water from separator 29 for delivery to conduit 39. Conduit 39 is connected to generator 40 and the water forms a level sensed by float 41 in the generator. The float 41 adjusts valve 42 which is in a by-pass conduit around pump 38. A pressure must be maintained in generator 40 which will deliver steam to tower 18 and overcome the pressure drops in the cycle to the separator. The generator burner 43 is fired so as to maintain this pressure high enough to overcome the pressure drops, yet low enough to avoid any higher pressure than necessary. Pressure detector 43A is connected to generator 40 so as to respond to the internal pressure of generator 40 and regulate fuel valve 45 in fuel line 44.

If the volume of the total liquids stripped in tower 18 changes, the amount of steam should be changed accordingly. The flow of steam is regulated by connecting a flow sensing device 46 in conduit 25 and having it adjust valve 47 in accordance with a manually set controller 48. Therefore, the volume of the stripping medium can be kept parallel with the demand for the medium by the liquids flowing to tower 18.

*Review of diluent-assisted treating.*—The foregoing process and system preferably utilize a diluent built from the crude production, kept in a closed cycle and returned to the system ahead of the basic field-processing equipment. The water, used to disengage the diluent from the crude production after it has been field-processed, is kept in a closed cycle, generated into steam and condensed back into water.

An initial charge of diluent may be used to reduce the viscosity and density of the mixture fed into the field-processing equipment. However, eventually this diluent charge changes in nature, becoming the lighter hydrocarbons of the crude itself. Also, if the crude does not have enough of the required hydrocarbons to form the required diluent, a make-up supply will have to be provided for the diluent cycle.

Particular volumes, temperatures and pressures are deliberately not cited. They would not add to the disclosure of the broad concepts of the present invention. The quantity and temperature of the steam necessary to strip the diluent from the processed crude is provided. The required cooling capacity, pump sizes and separator capacity are details which can be determined with simple engineering skill.

*Diluent-controlled gravity.*—FIG. 2 discloses a system with which the stripping system of FIG. 1 can be utilized to produce a diluent which can be blended with a selected quantity of the dehydrated crude oil to produce a mixture of desired API gravity. Basically, a structure is shown which employs weir structures to split the stream of dehydrated crude into portions of the relative sizes desired. In FIG. 2 the split is into two quantities having a desired ratio of sizes. A first of the quantities is stripped to a gravity which is the minimum on which a desired market price is available. The second of the quantities is blended with the diluent to yield the mixture with the API gravity at which a higher price is available. The sale of the two quantities yields a higher income than the total would have yielded at the common API gravity.

In FIG. 2 the dehydration, or treating, is carried out in vessel 50. The total well stream is connected to this vessel through conduit 51 and the dehydrated, or treated, oil is discharged through conduit 52. In general, the dehydration system is similar to that of FIG. 1 although a desander and water knockout, similar to 11, are not shown in FIG. 2.

The treated production is taken to stripping unit 53 where the lighter hydrocarbons are removed and conducted from the unit 53 through conduit 54. The dehydrated, and stripped, crude oil is removed through conduit 55 for division by weir structures into portions of predetermined size. The diluent is mixed with one of these portions.

Stripping unit 53 preferably includes equipment similar to tower 18, separator 29 and generator 40 of FIG. 1. Conduit 54 then compares with conduit 13 in conducting the diluent from a separator. Conduit 55 compares with conduit 19 in conducting the dehydrated, and stripped, crude oil to the splitting operation.

Flow splitter 56 is a vessel in which the total flow from conduit 55 is received and divided in desired quantities by a weir system. The ratio of these quantities may be adjustable. The principles embodied in this type of vessel may be found in U.S. Patents 3,202,167, 3,246,451 and 3,265,080. Basically, the total stream from inlet conduit 55 is divided by the weirs into two streams in conduits 57 and 58.

The stream of dehydrated crude oil in conduit 57 is stripped down to a gravity value which is the lowest of a predetermined bracket on which a market price is available. The stripping unit 53 is sized and operated to produce this first desired gravity for this first portion.

The low gravity oil split into conduit 58 is taken into a blending tank 59 where it is mixed with the diluent discharged from conduit 54. The result is a mixture with a gravity value in a bracket above the first bracket. A higher market price is available for this mixture. Therefore, the total financial return for the oil of tank 59 and the oil of tank 60 is more than the sum that would have been received if all the oil were sold at the gravity of the oil in conduit 52. This economic benefit is achieved since the market price of crude oil is not a linear function of its gravity.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:
1. A process for dehydrating crude oil and producing separate quantities of the crude oil with predetermined ranges of gravity, including:
   dehydrating a complete stream of crude oil to merchantable quality,
   stripping the complete stream of a predetermined range and quantity of lighter hydrocarbons,
   splitting the stripped stream with a weir system into predetermined quantities,
   storing for sale a first of the predetermined split quantities of first predetermined gravity,
   blending a second of the split quantities with the lighter hydrocarbons to produce a crude oil of second predetermined gravity, and
   storing for sale the crude oil of second predetermined gravity.

2. A system for processing crude oil liquid, including:
   apparatus connected to receive a stream of crude oil to be processed and arranged to remove enough water to produce crude oil of merchantable quality,
   a stripping unit connected to the dehydration apparatus to receive the crude oil and arranged to remove a predetermined quantity of a predetermined range of light hydrocarbons to produce crude oil of predetermined gravity,
   a flow splitting apparatus utilizing a weir system connected to the crude oil outlet of the stripping unit and arranged to divide the crude oil of predetermined gravity into predetermined quantities,
   a first storage facility for receiving one of the predetermined quantities from the flow splitter,
   a blending structure connected to the flow splitter for receiving another of the predetermined quantities from the flow splitter and connected to the stripping unit to receive the light hydrocarbons stripped from the crude oil produced by the dehydrating apparatus, the crude oil from the splitter and the light hydrocarbons from the stripping unit being blended to produce a crude oil of predetermined gravity different from that in the first storage facility, and
   a second storage facility connected to the blending structure to receive the blended crude oil.

3. A process for the control of the API gravity of crude oil, including:
   removing a predetermined range of the lighter hydrocarbons from a total stream of oil until the API gravity is reduced to the lower part of a first range of gravity for which a single market price is available,
   dividing a predetermined portion of the total stream from the total stream with a weir system, and
   adding the removed lighter hydrocarbons to the divided portion until the API gravity is raised to a second range of gravity for which a single market price is available.

4. A system for control of the API gravity of crude oil, including:
   a tower connected to receive a total stream of crude oil and arranged to remove enough of the lighter hydrocarbons to reduce the API gravity of the total stream to a lower of a first range of gravity for which range a uniform market price is available,
   a first vessel connected to the tower to receive the total stream from which the lighter hydrocarbons are removed and arranged to utilize a weir system to split the total stream into predetermined portions, and
   a second vessel connected to the first vessel and the tower to receive one of the portions split from the total stream and mix the lighter hydrocarbons with the split portion to raise the API gravity of the mixture to a second range for which a uniform market price greater than the first is available.

References Cited

UNITED STATES PATENTS

| | | | |
|---|---|---|---|
| 781,240 | 1/1905 | Starke | 208—106 |
| 2,342,166 | 2/1944 | Plummer | 208—93 |
| 3,060,116 | 10/1962 | Hardin et al. | 208—93 |
| 3,308,060 | 3/1967 | Ellis | 208—347 |
| 3,369,992 | 2/1968 | Henke et al. | 208—370 |

HERBERT LEVINE, *Primary Examiner.*

U.S. Cl. X.R.

137—3, 173; 196—46, 98, 155; 208—188, 308, 347, 363, 370; 210—84, 253